United States Patent
Martin et al.

(10) Patent No.: US 8,188,405 B2
(45) Date of Patent: May 29, 2012

(54) ELECTRIC ARC WELDING MACHINE AND OPERATING METHOD WITH MODULAR UNIT ENCLOSING COOLING UNIT

(75) Inventors: Alberto Martin, Sarcedo (IT); Mark Lowther, Lowion Warrington (GB); Roberto Orlandi, San Giuliano Milanese (IT)

(73) Assignee: ITW Welding Products Italy S.R.L., Milanese (IT)

( * ) Notice: Subject to any disclaimer, the term of this patent is extended or adjusted under 35 U.S.C. 154(b) by 991 days.

(21) Appl. No.: 11/214,021

(22) Filed: Aug. 30, 2005

(65) Prior Publication Data
US 2006/0043081 A1  Mar. 2, 2006

(30) Foreign Application Priority Data
Aug. 31, 2004  (IT) .............................. TO2004A0579

(51) Int. Cl.
B23K 9/10 (2006.01)
B23K 9/00 (2006.01)
(52) U.S. Cl. ..................................... 219/130.5; 219/136
(58) Field of Classification Search ............... 219/130.1, 219/130.5, 136, 137.9, 137.62, 137.63
See application file for complete search history.

(56) References Cited

U.S. PATENT DOCUMENTS

| | | | |
|---|---|---|---|
| 2,838,654 A | 6/1958 | Nugent | |
| 3,619,553 A | 11/1971 | Wilkens et al. | |
| 3,665,147 A | 5/1972 | Schobel et al. | |
| 4,371,318 A * | 2/1983 | Kime | 417/304 |
| 4,712,120 A * | 12/1987 | Latto | 346/145 |
| 4,717,805 A | 1/1988 | Miyagawa | |
| 4,721,947 A * | 1/1988 | Brown | 340/540 |
| 4,942,281 A | 7/1990 | Srba | |
| 5,189,277 A | 2/1993 | Boisvert et al. | |
| 5,208,436 A * | 5/1993 | Blankenship | 219/121.54 |
| 5,311,440 A | 5/1994 | Hess, Jr. | |
| 6,066,823 A | 5/2000 | Lageose | |
| 6,075,224 A | 6/2000 | De Coster | |
| 6,596,972 B1 * | 7/2003 | Di Novo et al. | 219/137.9 |
| 6,605,800 B1 | 8/2003 | Schick et al. | |
| 6,628,014 B2 | 9/2003 | Borup | |
| 6,758,423 B1 | 7/2004 | Perkins et al. | |
| 6,797,923 B2 | 9/2004 | Delgado et al. | |
| 6,933,465 B2 | 8/2005 | Bankstahl et al. | |
| 7,084,371 B2 * | 8/2006 | Hett et al. | 219/130.5 |
| 7,263,121 B2 | 8/2007 | Belge et al. | |
| 7,289,878 B1 | 10/2007 | Estelle et al. | |
| 2003/0132040 A1* | 7/2003 | Radosevich et al. | 180/65.1 |
| 2005/0205542 A1* | 9/2005 | DeCoster et al. | 219/137.62 |
| 2005/0258155 A1* | 11/2005 | DeYoung | 219/130.1 |

FOREIGN PATENT DOCUMENTS

| | | |
|---|---|---|
| DE | 19934367 A1 | 2/2001 |
| FR | 2536320 A1 | 5/1984 |
| FR | 2836641 A1 | 9/2003 |
| GB | 854224 | 11/1960 |
| WO | 02/43914 A1 | 6/2002 |

* cited by examiner

*Primary Examiner* — Sang Paik
(74) *Attorney, Agent, or Firm* — Lowe Hauptman Ham & Berner LLP

(57) ABSTRACT

A welding machine has a welding unit for generating a welding voltage/current, and at least one welding tool connectable to the welding unit by a cable. The welding unit has a closed protective casing, and a cooling unit for cooling the welding tool and/or cable on command. A modular unit containing the cooling unit is insertable and easily removable from inside the casing and is closed for protection of the welding unit.

14 Claims, 4 Drawing Sheets

ELECTRIC ARC WELDING MACHINE AND OPERATING METHOD WITH MODULAR UNIT ENCLOSING COOLING UNIT

RELATED APPLICATIONS

The present application is based on, and claims priority from, Italian Application Number TO2004A 000579, filed Aug. 31, 2004, the disclosure of which is hereby incorporated by reference herein in its entirety.

FIELD OF THE INVENTION

The present invention relates to a welding machine and relative operating method.

More specifically, the present invention relates to a welding machine for MIG (Metal Inert Gas) welding using a continuous wire in inert gas and pulsating or non-pulsating current supply; and/or MAG (Metal Active Gas) welding; and/or TIG (Tungsten Inert Gas) welding using a non-consumable tungsten electrode in inert gas; and/or STICK or MMA (Metal Manual Arc) welding; or multiprocess welding for selectively performing any one of the MIG, MAG, TIG, STICK welding processes; to which use the following description refers purely by way of example.

BACKGROUND OF THE INVENTION

As is known, known welding machines comprise a welding unit having a number of electric connectors supplied with a predetermined welding voltage/current; and a hand-held welding tool defined by a welding gun or torch and connected electrically by a power cable to the electric connectors on the welding unit, which supplies it with the voltage/current by which to generate the electric welding arc.

More specifically, the welding unit of the welding machine normally comprises an electric power module for supplying the external connectors with welding voltage/current; a wire-feed assembly for supplying the welding wire instant by instant, if the MIG or MAG welding process is selected; a bottle containing a mixture of gases supplied by conduits to a diffuser integrated in the torch; and a cooling unit also connected to the torch by conduits to cool both the torch body and the relative power cable.

More specifically, the cooling unit comprises a cooling circuit; a coolant tank; a radiator for outwardly releasing the heat accumulated by the coolant; and an electrically powered hydraulic pump for circulating the coolant in the cooling circuit.

Some known welding machines of the above type have a highly "compact" structure, in which all the above component parts are integrated and assembled inside a single protective casing. In such welding machines, each of the above component parts is therefore "integrated" stably and permanently inside the protective casing.

Welding machines of the above type, in which the welding unit has a "compact" integrated structure, are extremely practical, by being easy to carry and transport, and by eliminating external bulk in the form of electric cables or hydraulic conduits connecting the various component parts. In such welding machines, in fact, all the electric and hydraulic connections between the various units and modules are made at the assembly stage, thus making the machine extremely safe, both electrically, by preventing the operator from accidentally coming into contact with the electric cables, and as regards correct connection.

On the other hand, maintenance of the cooling unit of "compact" welding machines of the type described above is extremely awkward. That is, because of the extremely small amount of space between the electric cables and the highly electrically conductive component parts or conduits of the cooling circuit, repair of individual component parts of the cooling unit is extremely complicated and dangerous.

Any maintenance or repair of the cooling unit therefore calls for skilled technicians qualified to work in high-risk, electric discharge environments, thus increasing the cost of servicing and repairing the machine.

Moreover, to service or repair the cooling unit, the welding unit in some cases must be sent to specialized service facilities, thus resulting in prolonged downtime and a serious reduction in output.

To eliminate the above drawbacks, it has been proposed to separate the cooling unit from the welding unit by locating it outside the protective casing, so that it is independent of the other component parts inside the welding unit and therefore easier to service or repair. An external cooling unit comprises a number of electric and hydraulic connectors, which, when the welding machine is installed, are connected by electric cables and external cooling conduits to corresponding electric and hydraulic connectors on the power module and torch respectively.

Though simplifying maintenance of the cooling unit, the above solution also has several drawbacks.

In particular, installation of a welding machine with a separate cooling unit calls for skilled labour to connect the external cooling unit electrically and hydraulically to the component parts on the welding unit, thus increasing the installation cost of the welding unit. Moreover, the wiring and conduits outside the protective casing of the welding unit make the welding machine extremely bulky, awkward to carry, and electrically hazardous.

Finally, the external connectors and connecting cables of the cooling unit are extremely expensive, by having to conform with electric safety regulations, and so greatly increase the overall production cost of the welding machine.

SUMMARY OF THE INVENTION

It is an object of the present invention to provide a welding machine which has all the advantages of both "compact" welding machines and welding machines with external cooling units, while at the same time eliminating the respective drawbacks.

According to the present invention, there are provided a welding machine and a method of operating a welding machine, as claimed in the attached claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
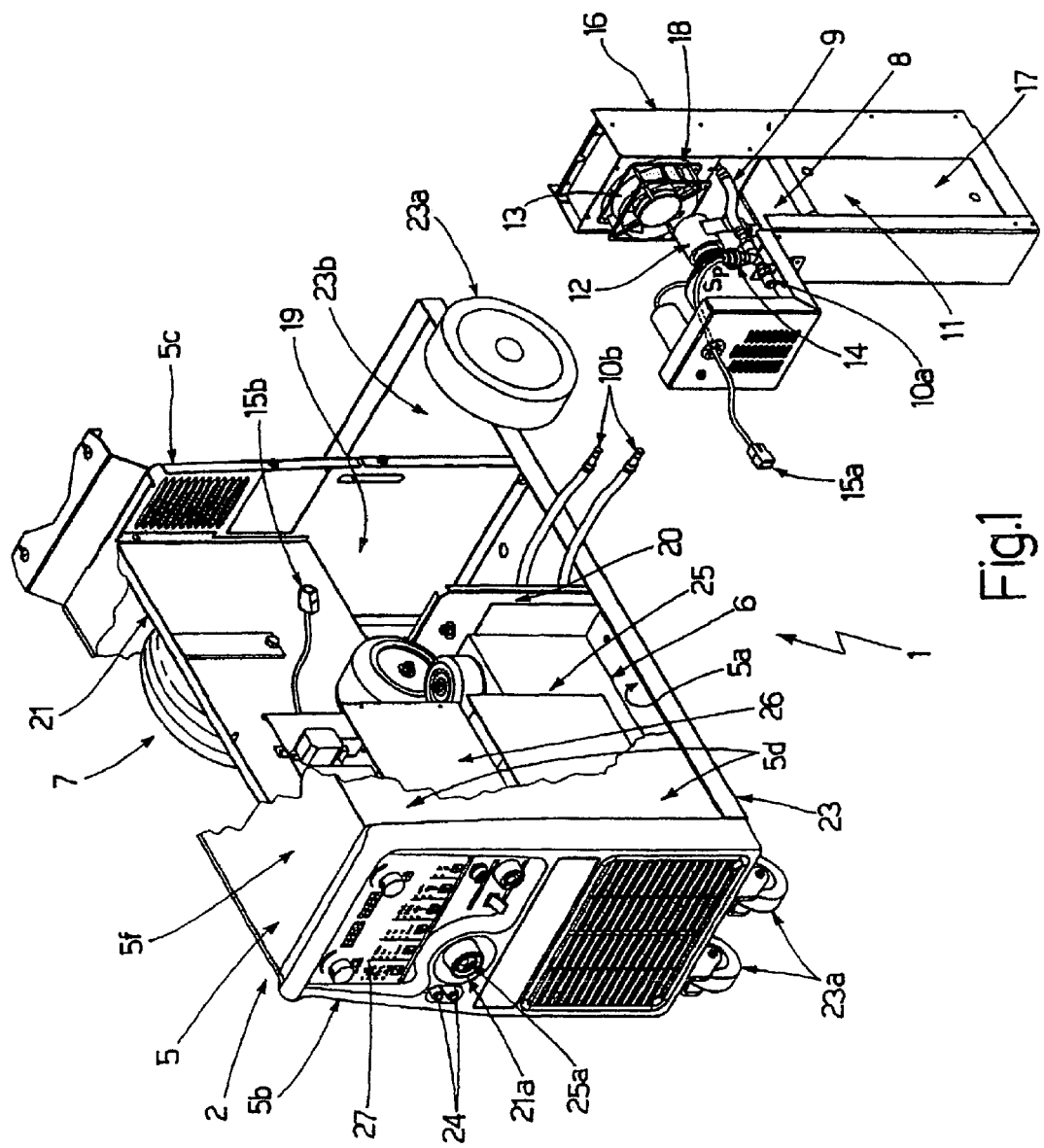
FIG. 1 shows a view in perspective, with parts removed for clarity, of a welding machine in accordance with the teachings of the present invention and in a first operating configuration in which the modular unit is removed from the welding unit.
Figure 2:
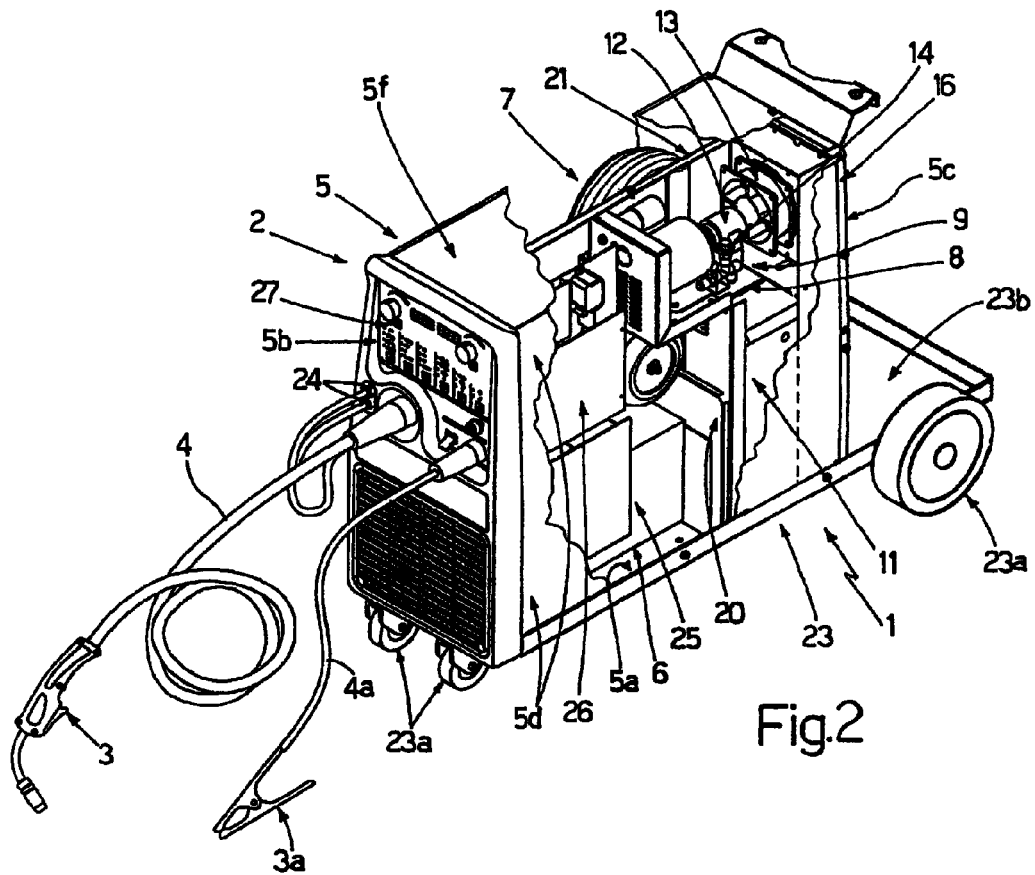
FIG. 2 shows a view in perspective of the FIG. 1 welding machine in a second operating configuration in which the modular unit is housed inside the welding unit.

With reference to FIGS. 1 and 2, number 1 indicates as a whole a welding machine comprising a welding unit 2 for generating voltage/current for a given welding process, and at least one welding tool 3 (shown in FIG. 2) comprising a welding gun or torch and connectable to welding unit 2 by a cable 4 of given length, which supplies it with the voltage/current by which to generate the electric welding arc.

Welding unit 2 also comprises a ground cable 4a (FIG. 2) for grounding the work and connectable to an electric connector on welding unit 2; and a ground clip 3a connected to the opposite end of the ground cable and fixed, in use, to the work to close the welding circuit.

Welding unit 2 comprises a protective casing 5 (shown partly in FIGS. 1 and 2) in which are housed an electric power generating circuit 6 for generating the voltage/current for the selected welding process; preferably, though not necessarily, a wire-feed assembly 7 which, on command, feeds the welding wire to welding tool 3; and a cooling unit 8 for supplying coolant by which to cool cable 4 and/or welding tool 3.

More specifically, with reference to FIG. 1, cooling unit 8 comprises a hydraulic circuit 9 having an inlet conduit and an outlet conduit, which are fitted on the ends with two fast-fit hydraulic connectors 10a (only one shown in FIG. 1) for connection to respective hydraulic connectors 10b on welding unit 2; and a tank 11 for coolant, such as a mixture comprising demineralized water and/or additional antifreeze fluids.

Cooling unit 8 also comprises a pumping device 12, e.g. a hydraulic pump powered by an electric motor, interposed between two conduits of hydraulic circuit 9 to circulate the coolant in the hydraulic circuit; and a heat-exchange device 13 located along a conduit of hydraulic circuit 9 to outwardly release the heat accumulated by the coolant during the welding process. In the FIGS. 1 and 2 example, heat-exchange device 13 comprises a radiator; and a cooling fan powered by an electric motor.

Cooling unit 8 also comprises at least one detecting device 14 interposed between two conduits of hydraulic circuit 9, and which supplies an output signal $S_P$ containing one or more operating parameters of cooling unit 8. More specifically, the operating parameters may comprise the pressure and/or flow and/or temperature of the coolant circulating in hydraulic circuit 9.

Cooling unit 8 also comprises at least one fast-fit electric connector 15a, to which are connectable a number of electric cables for powering the various electric devices of cooling unit 8, such as the electric motors powering the pump and/or the radiator cooling fan, and a cable of detecting device 14 supplying signal $S_P$. Electric connector 15a is connected to a respective connector 15b (FIG. 1) wired inside casing 5 of welding unit 2.

Unlike known welding machines, welding machine 1 comprises a modular unit 16 containing cooling unit 8, and which is housed stably inside closed protective casing 5, and can be extracted easily and detached from casing 5.

With reference to the FIG. 1 embodiment, modular unit 16 may be defined by a substantially parallelepiped-shaped frame made preferably, though not necessarily, of metal, and having an inner seat housing cooling unit 8.

More specifically, the inner seat of modular unit 16 comprises a bottom seat 17 formed in a bottom portion of the frame to house tank 11; and a top seat 18 formed in a top portion of the frame to house hydraulic circuit 9, pumping device 12, detecting device 14, and heat-exchange device 13.

In the FIGS. 1 and 2 embodiment, the frame of modular unit 16 is partly open on the two opposite major sides, and is made of a number of preferably U-section sheet metal pieces, which are bent and/or connected to one another to define a rigid, substantially inverted-L-shaped, peripheral housing structure.

Casing 5, on the other hand, is defined by a closed, preferably parallelepiped-shaped box casing having an inner compartment 19 (FIG. 1) in which modular unit 16 is housed and fixed in easily removable manner.

In the FIG. 1 embodiment, casing 5 has two rectangular vertical inner partition walls perpendicular to each other: a bottom inner wall 20, which extends upwards from an intermediate point of the base wall 5a of casing 5, is parallel to and faces the front wall 5b and rear wall 5c of casing 5; and a top inner wall 21, which extends over bottom inner wall 20, parallel to and faces the outer lateral walls 5d (shown partly in FIGS. 1 and 2) of casing 5.

More specifically, the space between bottom inner wall 20 and rear wall 5c defines a bottom seat of compartment 19 for housing the bottom portion of modular unit 16, and the space between top inner wall 21 and one lateral wall 5d of casing 5 defines a top seat of compartment 19 for housing the top portion of modular unit 16.

In use, modular unit 16 is housed inside compartment 19 with a portion of its rear wall preferably contacting rear wall 5c, and with one lateral wall resting on top inner wall 21, and is preferably, though not necessarily, fixed to top inner wall 21 and/or rear wall 5c by a known fastening system comprising, for example, screws or bolts, or click-on fastening devices (not shown), or any other type of fastening mechanism by which modular unit 16 can be fixed/removed to/from top inner wall 21 and/or rear wall 5c.

In connection with the above, it should be pointed out that, once modular unit 16 is housed inside compartment 19, cooling unit 8 and the other electric components of welding unit 2 are advantageously connected electrically by connecting fast-fit electric connectors 15a and 15b, and hydraulic connection is conveniently made by connecting fast-fit hydraulic connectors 10a and 10b.

In the FIG. 1 embodiment, base wall 5a of casing 5 is integrated in a supporting plate of a carriage 23 having a number of wheels 23a by which to move welding unit 2 manually. More specifically, the supporting plate of carriage 23 comprises a portion 23b, outside casing 5, for supporting a bottle (not shown) containing the welding gas mixture.

Casing 5 also comprises a cover defined by a top wall 5f and by lateral walls 5d, and which is fitted to the peripheral edges of front wall 5b and rear wall 5c and/or to base wall 5a to completely close casing 5 and house all the components of welding unit 2, particularly modular unit 16. It should be pointed out that, in use, when housed inside compartment 19, modular unit 16 is accessible from outside casing 5 by first removing the cover of casing 5 from base wall 5a.

In a variation not shown, the walls of the cover of casing 5 may be connected by one or more hinges (not shown) so that, in use, for example, one or both lateral walls 5d may be opened/closed for easy access to the inside of casing 5 and easy removal/insertion of modular unit 16 from/inside compartment 19.

With reference to FIG. 1, on the opposite side to compartment 19, top inner wall 21 of casing 5 is fitted in known manner with wire-feed assembly 7, which comprises a wire-feed unit (not shown) for feeding the welding wire to welding tool 3 through a wire-guide connector 21a (FIG. 1) integrated in front wall 5b of casing 5 and connectable, in use, to a wire-guide cable (not shown) of welding tool 3. Wire-feed assembly 7 is known and therefore not described in detail.

Preferably, though not necessarily, two hydraulic connectors 24 are also integrated in front wall 5b, are connected by hydraulic conduits (not shown) to hydraulic connectors 10b, and are supplied by cooling unit 8 with coolant for supply to welding tool 3.

Electric power generating circuit 6 comprises a power stage 25 for supplying electric welding voltage/power to an electric connector 25a preferably located on front wall 5b of casing 5 for electric connection to cable 4; and a control stage 26 for controlling power stage 25 in such a manner as to control the voltage/current supplied to welding tool 3 during the welding process.

In the FIGS. 1 and 2 embodiment, power stage 25 rests on base wall 5a, in the gap between bottom inner wall 20 and front wall 5b, and control stage 26 is fixed to a portion of the side of top inner wall 21 adjacent to compartment 19, and is connected electrically to electric connector 15b to electrically power, and receive signal $S_P$ from, cooling unit 8.

Welding unit 2 also comprises a control panel 27 preferably fixed to front wall 5b of casing 5, next to wire-guide connector 21a and electric connector 25a, and which enables the operator to manually enter various selection and/or adjustment commands relative to the welding processes performable by welding machine 1.

More specifically, in the FIGS. 1 and 2 embodiment, control panel 27 comprises a number of selection knobs and/or keys for entering data and control instructions; and a number of display devices for displaying information relative, for example, to the selected welding process (MIG, MAG, TIG, STICK), or the type of welding tool 3 connected, or the welding voltage/current generated.

Figure 3:
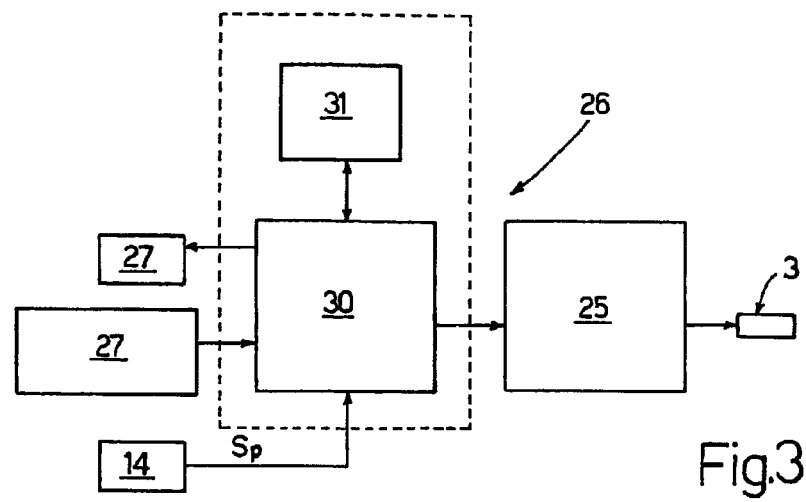
FIG. 3 shows an electric block diagram of a control stage of the FIGS. 1 and 2 welding machine.

With reference to FIG. 3, control stage 26 comprises a supervising unit 30 defined, for example, by a microprocessor for controlling the value of the voltage/current supplied by power stage 25 (as described in detail below); and a memory unit 31 for storing one or more welding process tables, each containing voltage/current values to be supplied to welding tool 3 when a respective operating condition of cooling unit 8 occurs.

Supervising unit 30 is also supplied by control panel 27 with signals coding the commands to be imparted to welding machine 1, such as welding process selection commands and/or commands to adjust the voltage/current value to be used in the selected welding process.

In actual use, supervising unit 30 processes signal $S_P$ to determine the operating state of cooling unit 8, cooperates with memory unit 31 to determine the voltage/current value associated with the operating state, and controls power stage 25 to generate a voltage/current corresponding to the value determined in memory unit 31.

Figure 4:
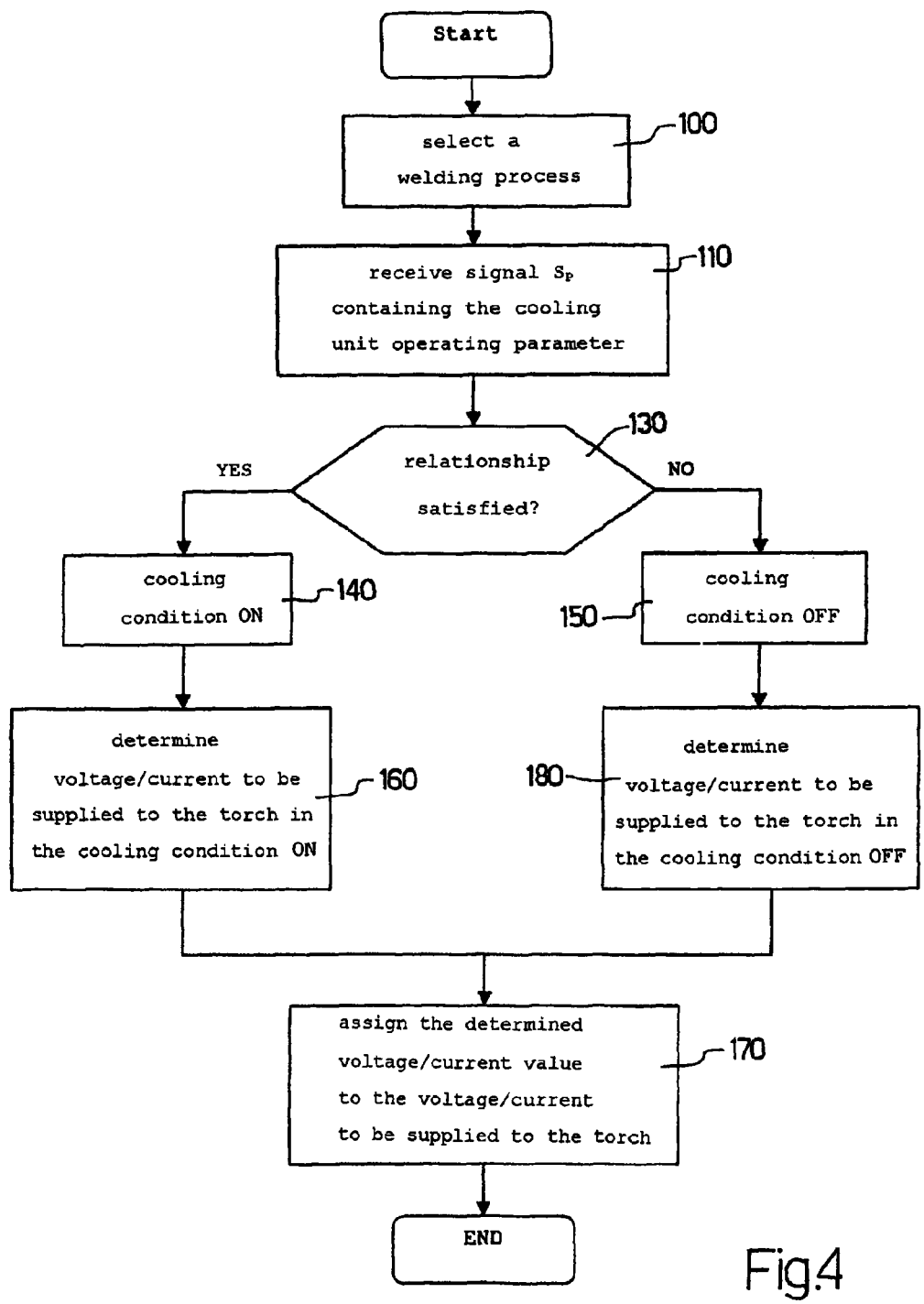
FIG. 4 shows a flow chart of the operations performed by the welding machine in a first operating mode.

FIG. 4 shows an example of how welding machine 1 operates, and in which the tables stored in memory unit 31 are assumed to relate to respective welding processes such as TIG, MIG, MAG, STICK, and to each contain at least two voltage/current values: a first value relative to operation of welding tool 3 (e.g. the torch) in a cooling-on condition corresponding to correct operation of cooling unit 8; and a second voltage/current value relative to operation of the torch in a cooling-off condition corresponding to no operation or malfunctioning of cooling unit 8.

In connection with the above, it should be pointed out that the voltage/current values in each table stored in memory unit 31 may be set and adjusted by the operator on control panel 27 when first configuring welding machine 1.

To begin with, the operator selects the desired welding process, i.e. TIG or MIG/MAG or STICK, on control panel 27 (block 100).

Once the welding process is selected, detecting device 14 supplies signal $S_P$, containing one or more operating parameters of cooling unit 8, to supervising unit 30 (block 110), which processes it to determine whether the detected operating parameter/s, i.e. coolant pressure and/or flow and/or temperature, satisfy given relationships with corresponding predetermined thresholds (block 130). A relationship may be satisfied, for example, when coolant pressure and/or flow exceed respective predetermined thresholds and/or when coolant temperature is below a respective predetermined threshold.

In the event of a positive response (YES output of block 130), i.e. coolant pressure and/or flow and/or temperature satisfy the predetermined relationships with the respective predetermined thresholds, supervising unit 30 determines the cooling-on condition (block 140); conversely, in the event of a negative response (NO output of block 130), i.e. coolant pressure and/or flow and/or temperature fail to satisfy the predetermined relationships with the respective predetermined thresholds, supervising unit 30 determines a cooling-off condition (block 150). It should be pointed out that, when welding unit 2 has no cooling unit 8, supervising unit 30 receives no signal $S_P$, and so determines the cooling-off condition.

If the cooling-on condition is determined, supervising unit 30 interrogates memory unit 31 to determine the first voltage/current value in the table relative to the selected welding process (block 160), and controls power stage 25 to supply welding tool 3 with a voltage/current value corresponding to the first voltage/current value determined (block 170).

Conversely, if the cooling-off condition is determined, supervising unit 30 interrogates memory unit 31 to determine the second voltage/current value in the table relative to the selected welding process (block 180), and controls power stage 25 to supply welding tool 3 with a voltage/current value corresponding to the second voltage/current value (block 170).

The above operating method of controlling the voltage/current generated by power stage 25 as a function of the condition of cooling unit 8 may obviously also be implemented by control stage 26 when dealing with a non-modular cooling unit 8 integrated permanently in casing 5 ("compact" welding machine) or with a cooling unit 8 separate from welding unit 2, i.e. outside casing 5.

Welding machine 1 has numerous advantages, In particular, given the modular design of cooling unit 8, welding machine 1 is highly versatile by simplifying any maintenance of cooling unit 8. That is, modular unit 16 containing cooling unit 8 may be inserted/removed easily inside/from casing 5, thus eliminating any possibility of accidental contact with the electric circuits inside welding unit 2, and so making the component parts easier to work on.

Moreover, all the electric cables and hydraulic conduits connecting cooling unit 8 to the various component parts of welding unit 2 are enclosed inside casing 5, thus reducing the risk of accidental electric contact and making welding machine 1 more compact and easier to transport. Using fast-fit electric and hydraulic connectors greatly simplifies internal connection of cooling unit 8, thus further simplifying insertion/removal of cooling unit 8 inside/from welding unit 2.

Welding machine 1 also has the major advantage of fully automatically adjusting the voltage/current supplied to welding tool 3 as a function of both the selected welding process and the operating condition of cooling unit 8, thus ensuring correct voltage/current supply to the torch by welding unit 2 both in the absence of and in the event of malfunctioning of cooling unit 8. This therefore safeguards against overheating of the torch as a result of a fall in coolant pressure and/or flow caused by clogging or interruption of the hydraulic conduits, or as a result of malfunctioning of the hydraulic pump or heat-exchange device, which may cause a sharp rise in temperature of the cable and torch, which not only damages the torch but also endangers the operator in the event of contact with the torch body.

Clearly, changes may be made to welding machine 1 and the method as described and illustrated herein without, however, departing from the scope of the present invention.

Figure 5:
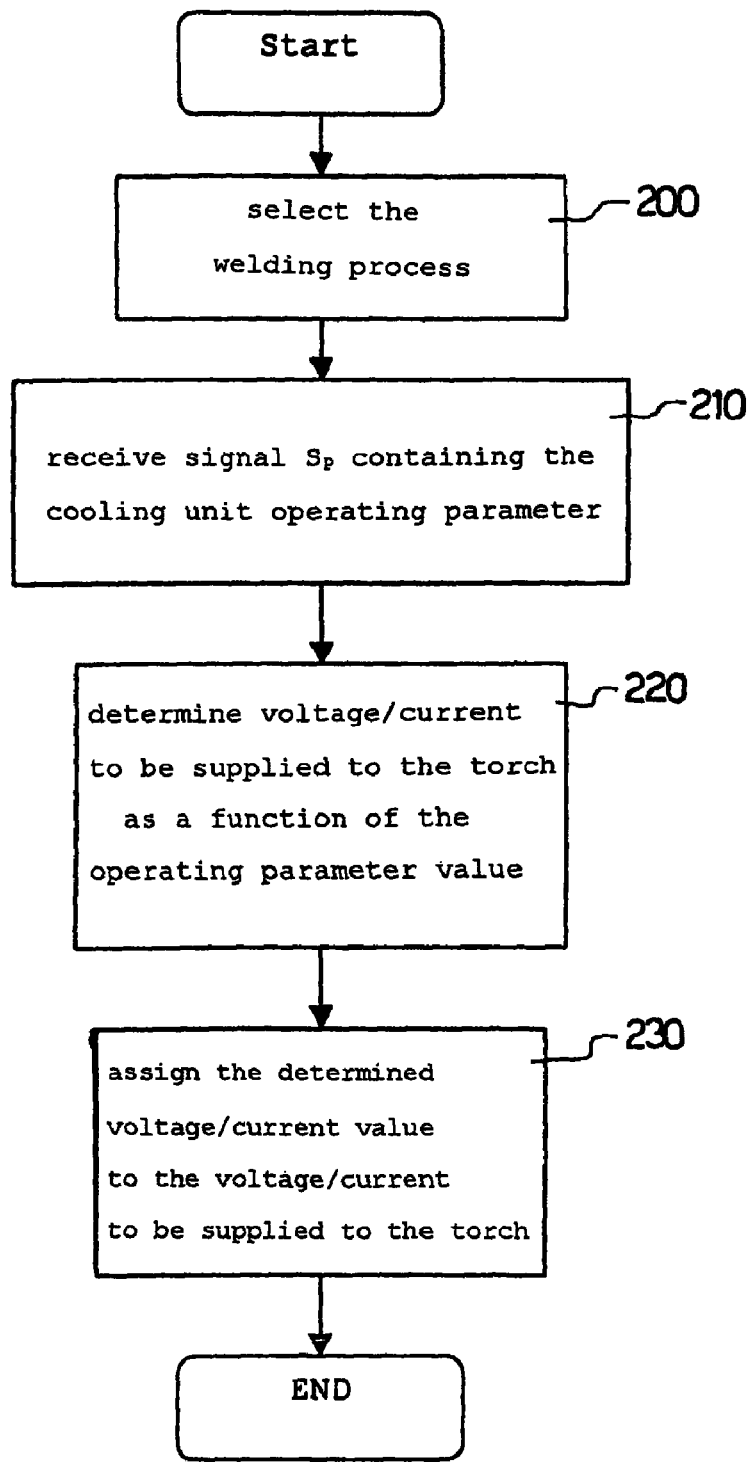
FIG. 5 shows a flow chart of the operations performed by the welding machine in a second operating mode.

More specifically, FIG. 5 shows a variation of the method of operating welding machine 1, in which each of the welding process tables is assumed to contain a number of voltage/current values, each relative to one or more operating parameters of cooling unit 8. In other words, each table defines a function supplying a voltage/current value on the basis of one or more operating parameters, such as coolant pressure and/or flow and/or temperature.

Once the welding process is selected (block 200) and signal $S_P$ received (block 210), supervising unit 30 interrogates memory unit 31 to determine the voltage/current to be supplied to welding tool 3 as a function of the detected operating parameter/s (block 220).

At this point, supervising unit 30 controls power stage 25 to supply welding tool 3 with a voltage/current corresponding to the value determined in the table (block 230).

The invention claimed is:

1. A welding machine, comprising:
    a welding unit for generating a welding voltage or current,
    a welding tool connectable to the welding unit by a cable to receive the welding voltage or current; and
    a modular unit comprising a cooling unit for selectively cooling the welding tool and the cable based upon an operating parameter of the cooling unit;
    wherein
    the welding unit comprises:
        an electric power generating device for supplying the welding voltage or current to the welding tool, and
        a casing housing therein the electric power generating device and further having an inner compartment for removably housing the modular unit;
    the cooling unit includes
        a coolant tank configured to contain a coolant,
        a hydraulic circuit connected to the coolant tank and having an inlet conduit and an outlet conduit,
        a heat exchanger positioned along the hydraulic circuit for dissipating heat from the hydraulic circuit,
        a fast-fit electrical connector for detachable electrical connection with a matching electrical connector of the welding unit for receiving electrical power for operation of the cooling unit from the welding unit, and
        fast-fit hydraulic connectors at the inlet conduit and outlet conduit, respectively, for detachable hydraulic connection with matching hydraulic connectors of the welding unit,
    the modular unit includes a frame which has an inner seat containing an entirety of the cooling unit, the frame being receivable in and completely removable from the inner compartment of the casing; and
    when the frame with the entire cooling unit contained therein is received in the inner compartment of the casing, all of the detachable electrical and hydraulic connections between the cooling unit and the welding unit are enclosed inside the casing.

2. A welding machine as claimed in claim 1, wherein the casing comprises a base wall, and a cover which fits onto the base wall to close the inner compartment of the casing;
    the modular unit being removably housable in the inner compartment formed inside the casing so as to be accessible from outside the casing by detaching the cover from the base wall.

3. A welding machine as claimed in claim 1, wherein the cooling unit further comprises a detector for supplying a state signal indicative of the operating parameter of the cooling unit;
    the electric power generating device comprising
        a power stage for supplying the welding voltage or current to the welding tool, and
        a controller for controlling the power stage to regulate, as a function of the state signal, a value of the welding voltage or current supplied by the power stage to the welding tool.

4. A welding machine as claimed in claim 3, wherein the controller comprises a memory containing a number of predetermined voltage or current values, each said voltage or current value being associated with a relative value of the operating parameter of the cooling unit or with a given welding process or with a given cooling condition of the cooling unit.

5. A welding machine as claimed in claim 4, wherein the controller comprises a processor for
    determining, in the memory, a predetermined voltage or current value as a function of the operating parameter of the cooling unit in the state signal; and
    controlling the power stage to supply the welding tool with the voltage or current value determined in the memory.

6. A welding machine as claimed in claim 4, wherein the controller comprises a processor for
    processing the state signal to determine a cooling-on condition or a cooling-off condition of the cooling unit;
    determining, in the memory, a predetermined voltage or current value as a function of the determined cooling-on condition or cooling-off condition of the cooling unit; and
    controlling the power stage to supply the welding tool with the voltage or current value determined in the memory.

7. A welding machine as claimed in claim 5, the welding unit comprising at least one control panel enabling an operator to set a predetermined welding process in the controller;
    each said predetermined voltage or current value in the memory being determined as a function of the welding process set in the controller.

8. A welding machine as claimed in claim 7, wherein the predetermined welding process is a MIG or MAG or TIG or STICK process.

9. A welding machine as claimed in claim 1, wherein the operating parameter of the cooling unit is a temperature of the coolant.

10. An operating method for operating a welding machine comprising:
    a welding machine comprising,
    a welding unit for generating a welding voltage or current, a welding tool connectable to the welding unit by a cable to receive the welding voltage or current; and a modular unit comprising a cooling unit for selectively cooling the welding tool and the cable based upon an operating parameter of the cooling unit;

wherein the welding unit comprises:
- an electric power generating device for supplying the welding voltage or current to the welding tool, and
- a casing housing therein the electric power generating device and further having an inner compartment for removably housing the modular unit;

the cooling unit includes
- a coolant tank configured to contain a coolant,
- a hydraulic circuit connected to the coolant tank and having an inlet conduit and an outlet conduit,
- a heat exchanger positioned along the hydraulic circuit for dissipating heat from the hydraulic circuit,
- a fast-fit electrical connector for detachable electrical connection with a matching electrical connector of the welding unit for receiving electrical power for operation of the cooling unit from the welding unit, and
- fast-fit hydraulic connectors at the inlet conduit and outlet conduit, respectively, for detachable hydraulic connection with matching hydraulic connectors of the welding unit, the modular unit includes a frame which has an inner seat containing an entirety of the cooling unit, the frame being receivable in and completely removable from the inner compartment of the casing; and when the frame with the entire cooling unit contained therein is received in the inner compartment of the casing, all of the detachable electrical and hydraulic connections between the cooling unit and the welding unit are enclosed inside the casing;

acquiring the operating parameter of the cooling unit; and regulating, as a function of the acquired operating parameter of the cooling unit, a voltage or current value of the welding voltage or current supplied by the electric power generating device to the welding tool.

11. An operating method as claimed in claim 10, wherein the regulating comprises:
- determining whether the acquired operating parameter of the cooling unit and a respective predetermined threshold satisfy a predetermined relationship;
- accordingly determining a cooling-on condition or a cooling-off condition of the cooling unit; and
- determining, on the basis of the determined cooling-on or cooling-off condition, a respective voltage or current value from a number of predetermined values stored in a memory of the welding unit.

12. An operating method as claimed in claim 10, wherein the operating parameter of the cooling unit comprises at least one selected from the group consisting of temperature, pressure and flow of the coolant supplied by the cooling unit.

13. An operating method as claimed in claim 11, wherein each said predetermined voltage or current value being associated with a given selectable welding process, and
- a first predetermined voltage or current value in the memory is associated with the cooling-on condition and a different second predetermined voltage or current value in the memory is associated with the cooling-off condition for a given selectable welding process.

14. An operating method as claimed in claim 10, further comprising
- completely removing the modular unit, with the entirety of the cooling unit contained therein, from the casing, and
- disconnecting the fast-fit electrical and hydraulic connectors of the cooling unit from the matching electrical and hydraulic connectors of the welding unit.

* * * * *